UNITED STATES PATENT OFFICE.

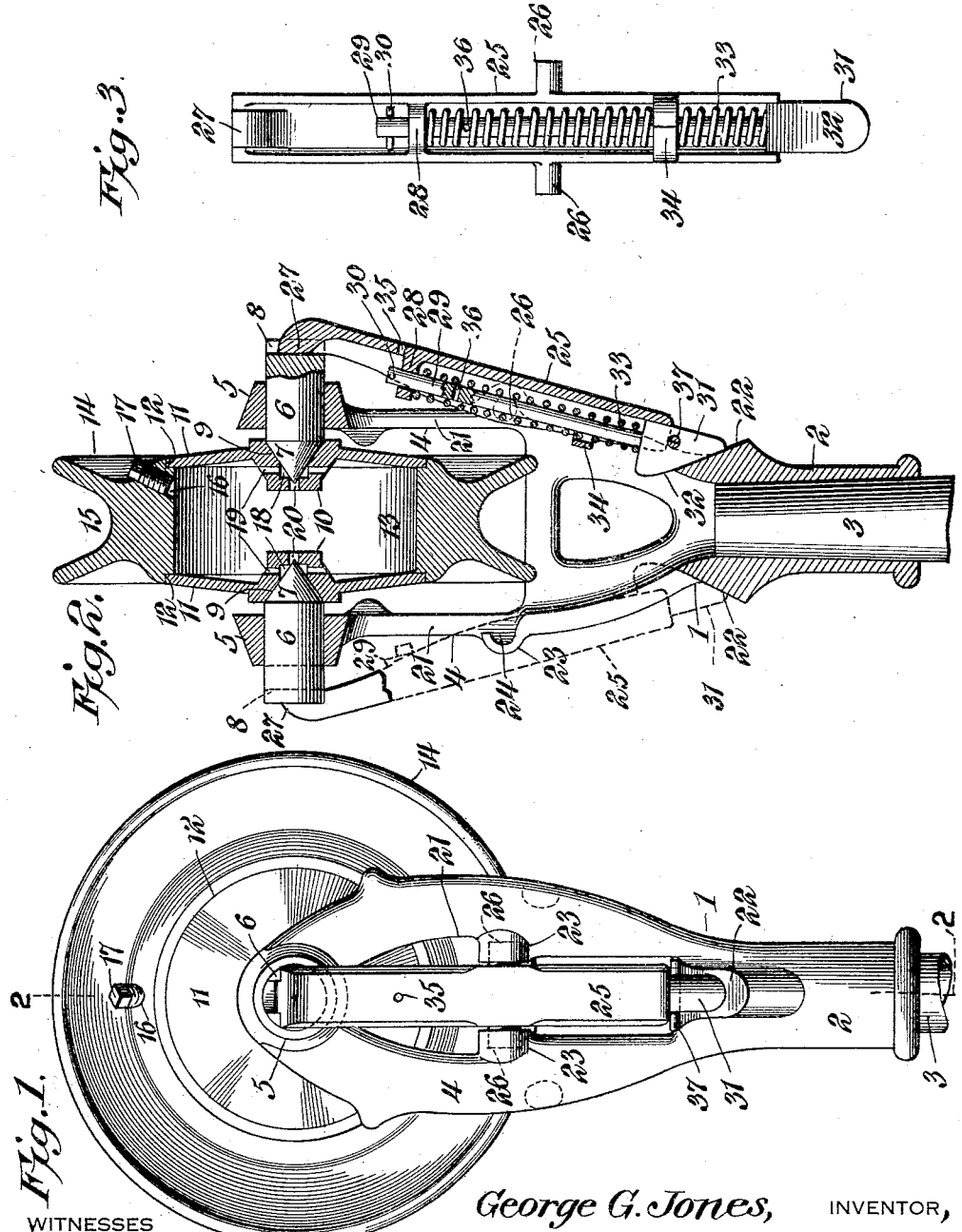
G. G. JONES.
TROLLEY WHEEL MOUNT.
APPLICATION FILED AUG. 6, 1913.
1,114,770.
Patented Oct. 27, 1914.
George G. Jones, INVENTOR,
BY
ATTORNEY
WITNESSES

GEORGE G. JONES, OF CLEVELAND, OHIO, ASSIGNOR OF ONE-HALF TO ROBERT H. RIFFE, OF CLEVELAND, OHIO.

TROLLEY-WHEEL MOUNT.

1,114,770.   Specification of Letters Patent.   Patented Oct. 27, 1914.

Continuation of application Serial No. 735,591, filed December 9, 1912. This application filed August 6, 1913. Serial No. 783,432.

*To all whom it may concern:*

Be it known that I, GEORGE G. JONES, a citizen of the United States, residing at Cleveland, in the county of Cuyahoga and State of Ohio, have invented a new and useful Trolley-Wheel Mount, of which the following is a specification.

This invention has reference to improvements in trolley wheel mounts, and its object is to provide a trolley wheel and bearing therefor permitting the running of the trolley wheel with a minimum amount of friction, and at the same time provide for ample electrical contact maintained practically constant at all times.

The invention comprises a trolley wheel constructed to contain a supply of lubricant and bearings for the trolley wheel presenting broad or extensive surfaces ample to carry large currents without heating, and an automatically operative impeller for the bearings constantly taking up all wear, but practically non-yieldable to any force exerted upon the trolley wheel and tending to move it out of its proper position or to cause vibration in its support. At the same time the structure is such that it may be readily dismantled without the aid of special tools and is readily reassembled.

This application is a continuation of my application No. 735,591, filed December 9, 1912, for improvements in trolleys, in so far as it discloses matter in common with said prior application.

The invention will be best understood from a consideration of the following detailed description, taken in connection with the accompanying drawings forming a part of this specification, with the further understanding that while the drawings show a practical form of the invention the latter is not confined to any strict conformity with the showing of the drawings, but may be changed and modified so long as such changes and modifications mark no material departure from the salient features of the invention.

In the drawings:—Figure 1 is a side elevation of the trolley wheel and head carrying the same. Fig. 2 is a section on the line 2—2 of Fig. 1, with some parts shown in elevation. Fig. 3 is an inner face view of one of the bearing impelling members.

Referring to the drawings there is shown a trolley head 1 provided with the usual socket 2 for receiving a trolley pole 3. The head 1 may be of skeleton type with oppositely disposed arms 4 each terminating at the free end in a boss 5 with a passage therethrough for a bearing pin 6, the latter having one end 7 preferably of conical shape and the other end provided with a transverse groove or recess 8. The bosses 5 are so disposed that the pins 6 are in alinement one with the other with their conical ends 7 directed one toward the other and the recesses 8 outermost. The conical end 7 engage conical seats 9 in hubs 10 each at the center of a disk 11 preferably more or less dished and seated at the periphery in a rabbet 12 formed at the corresponding end of a central passage 13 through an annular trolley wheel body 14 provided with the usual circumferential groove 15 on its outer edge adapted to a trolley wire, as is customary.

The disks or plates 11 are fitted tightly in the rabbets 12 and may be secured to the body of the trolley wheel either by being forced thereinto or in any suitable manner, so that these disks in operation are effectively part of the trolley wheel and form the end walls of the chamber 13. The body 14 of the trolley wheel has a passage 16 formed therein opening into the chamber 13, and this passage is normally closed by a plug 17 which may be a screw plug, in which case the passage 16 is appropriately threaded to receive it.

The hubs 10 enter the chamber 13 for an appropriate distance and each has formed in it at the base of the seat 9 a counterbore 18 from which extend passages 19 to the chamber 13, and if desired a passage 20 also to the chamber 13 in line with the longitudinal axis of the corresponding pin 6. The passages 19 and 20 and the counterbore 18 serve as convenient means for the access of lubricant from the chamber 13 to the bearing surfaces of the end 7 of the pin 6 and seat 9 where engaged by said end 7, it being understood that the chamber 13 is supplied with a suitable lubricant through the passage 16, and this chamber 13 may be of a size which will hold a supply of lubricant capable of lasting for a long time.

The conical end 7 and seat 9 provide broad bearing surfaces sufficient to transmit as heavy an electric current as the trolley wheel will be called upon to carry in service, and this without appreciable heating, wherefore there is no liability of injury to the bearings from heating due to the action of the electric current, and since, as will hereinafter appear, the bearings are maintained in firm contact at all times, there is no liability of arcing at the bearings with consequent injury thereto.

Each arm 4 is provided with a central opening 21 elongated in the direction of the length of the arm and extending from the boss 5 to a point quite close to the socket 2 and at the latter point there is formed a bevel face 22, while intermediately of the space 21 the side walls of the arm 4 bordering such space are formed with lugs 23 in line with and facing each other, and these lugs have each a concavity 24 on its inner face.

There is also provided for each side of the trolley head an elongated channel member 25 having oppositely disposed and directed trunnions 26 adapted to the concavities 24 in the lugs 23, the width of the channel member 25 being such as to extend approximately from one lug to the other with the trunnions 26 seated in said lugs. One end of the channel member is formed into a tongue 27 adapted to engage in the recess 8 of the corresponding pin 6 when the trunnions are seated in the lugs 23, while the channel member is of such length that the other end will then not quite reach to the corresponding end of the bevel surface 22.

At a point on the inner face of the channel member 25 nearer to the tongue 27 than to the other end of the channel member there is formed a guide member 28 outstanding from the bottom of the channel and preferably in one piece with the channel member, and through this guide member 28 there extends one end of a rod 29 traversed by a pin 30 preventing the rod from moving entirely out from the guide 28. At the other end the rod is formed with or has fast thereto a block 31 of a size to move freely along the corresponding end of the channel member which is there open, and this block has a bevel face 32 matching the bevel face 22 in the corresponding end of the socket 2 where the socket joins the corresponding arm 4. The rod 29 between the bearing 28 and block 31 is surrounded by a spring 33 tending constantly to force the head 31 away from the bearing member 28 until arrested by the pin 30 and the headed end of the rod 29 is prevented from moving out of the channel member in a direction transverse to the length thereof by a retaining member 34 which may be in the form of fingers formed on the side walls of the channels and bent over the rod, and this spring or any other arrangement for retaining the rod in place may be employed.

The channel member adjacent to the bearing 28 has a perforation 35 therethrough, and the rod 29 has a perforation 36 therethrough so disposed that when the head 31 is moved against the action of the spring until its thin end is about coincident with the corresponding end of the channel member, the perforations or holes 35 and 36 coincide, whereupon a retaining pin may be inserted through both, thus holding the head 31 in the retracted position, and then the channel member may be inserted into the opening 21 to an extent permitting the arrangement of the trunnions 26 in the concavities 24 with the tongue 27 in the recess 8 and the thin end of the block 31 about coincident with the upper end of the bevel surface 22, which, since this bevel is inwardly toward the center of the head 1, may be termed its upper inner end. Now on the withdrawal of the pin holding the rod 29 in the retracted position, the expansion of the spring 33 which is then under increased compression, will cause the beveled surface 32 to ride along the beveled surface 22, thus rocking the channel member 25 on the pivot supports formed by the trunnions 26 and lugs 23 in a direction to force the corresponding pin 6 inwardly with respect to the head 1, and when both channel members are in position their actions are in opposite directions and hence the pins 6 are forced one toward the other until arrested by engagement with the seats 9 on opposite sides of the trolley wheel. The channel members 25 with the spring actuated blocks 31 engaging the bevel surfaces 32, act as impellers for the bearing pins 6 tending at all times to force these pins one toward the other, but the direction of movement of the blocks 31 toward the bevel surfaces 22 about the axis of the trunnions 26 is so close to a line perpendicular with respect to the bevel surfaces 22 that no force which would be exerted upon the pins 6 tending to separate them will be sufficient to cause a movement of the blocks 31 in a direction to compress the spring 33, wherefore the impellers are unyieldable to any force tending to separate the pins 6, while readily taking up any wear, for these impellers constantly tend to move the pins one toward the other. The result of this is that the bearings of the trolley wheel which are always in alinement because of the initial alinement of the pins 6, are also always in firm unyielding engagement with the trolley wheel so far as any force tending to separate these pins is concerned, and the trolley wheel is therefore always free from vibration, and its bearings are always tight, since they cannot at any time loosen in the slides. Since the provision for lubricant is ample, the trolley wheel rotates with a minimum of frictional resistance, even though the bearing surfaces be extensive as demanded by the necessity of transmitting large electric currents.

In describing the ends 7 as conical, it is to be understood that this term is to be considered as sufficiently flexible to cover other shapes answering the same purpose for some variation from a true conical form is permissible, although excellent results are obtained from a comparatively strict adherence to the conical form.

While the surfaces 22 and 32 are described as bevel surfaces, it is to be understood that this term is a term of convenience, for strict adherence to true plane bevel surfaces is not demanded, and these surfaces may be somewhat differently shaped, so long as any rocking of the impeller channel member 25 in a direction toward the center of the trolley wheel causes the block 31 to travel along the surface 22 with which it engages under the expanding action of the compressed spring 33. The force with which the pins 6 engage in their seats 9 depends upon the strength of the springs 33, and their degree of compression. It is to be noted that each impeller is entirely independent of the other and is in no way affected by the other, since when once adjusted neither impeller would yield outwardly at the end where engaged by the pin 6, but always tends to force its pin toward the other pin, wherefore the trolley wheel is maintained substantially centralized and can at no time vibrate because of a loose bearing support.

In order to take down the device, the block 31 and rod 29 are forced in a direction causing the block 31 to move into the channel member 25 until the passages 35 and 36 coincide. In order to prevent careless or malicious disassembling of the trolley wheel and head, each block 31 is provided with a transverse passage in which is located a cotter pin 37, so that without the aid of a tool permitting the withdrawal of the cotter pin the structure when once assembled cannot be dismantled. The pin 37 is so located in the head 31 as not to interfere with the normal action of the head 1 sliding along the surface 22, since this movement is always toward the outer end of the surface 22 and never in the reverse direction except from a purposely applied force directed against the block 31 to compress the spring 33.

In the structure of the present invention the pins 6, which may be termed journal pins, are maintained in alinement with their sliding bearings in the arms 4 forming fixed parts of the trolley head 1, and these sliding bearings are sufficiently elongated to maintain such alinement. Moreover, the journal pins are constantly urged one toward the other, so as to automatically take up all wear and prevent any looseness of the bearings, but the construction is such that no force applied to the trolley wheel tending to separate the journal bearings, or to move them in the reverse direction to their normal tendency can have any such effect, since these pins are practically immobile in one direction, though readily movable in the other. At the same time the structure is such as to be readily disassembled and when reassembled will automatically adjust itself and maintain such adjustment indefinitely.

The structure of the present invention is particularly adaptable to trolleys, both because of necessity of a positive bearing capable of carrying large electric currents, and at no time liable to looseness, and, moreover, capable of high speed without frictional heating. While the invention is not of necessity limited to a trolley wheel structure, and may be employed in part in connection with other rotatable structures, it has features which make it more valuable in connection with trolley wheels than with other structures where no electric current passes between the wheel and its bearings.

What is claimed is:—

1. The combination with a rotatable member, of slidable journal members therefor, relatively fixed supports for the slidable journal members, and means having a constant tendency to move the journal members one toward the other.

2. The combination with a rotatable member, of elongated alined journal bearings therefor, supports in which the journal bearings are slidable in the direction of their length, and impellers for the slidable journal bearings having a constant tendency to move said bearings one toward the other and provided with means preventing retrograde movement of the journal bearings.

3. The combination with a wheel, of journal pins therefor on opposite sides thereof, relatively fixed supports for the journal pins in which they are longitudinally movable in alinement one with the other, and impelling means for the journal pins constructed to constantly act thereon to move the pins one toward the other, said impelling means being provided with means for preventing movement of the pins in the reverse direction.

4. The combination with a wheel having a hub portion with oppositely disposed seats in the axis of rotation of the wheel, elongated alined journal pins each having one end adapted to a respective seat, a relatively fixed support for each journal pin in which it is slidable longitudinally, said supports being adapted to hold the pins in alinement with their adjacent ends in the seats in the wheel hub portion, and impellers for the journal pins each provided with means having a constant tendency to move the pins one toward the other and also provided with means for preventing movement of the pins in the other direction.

5. The combination with a wheel provided with an internal chamber and with a hub portion having exterior axial seats communicating with the internal chamber, journal pins each having one end adapted to a respective axial seat, a relatively fixed support for each journal pin in which it is mounted for movement longitudinally of the pin, and an impeller for each journal pin in engagement with the outer end thereof, said impeller being provided with means constantly active to move the journal pin toward its seat in the wheel, and means for holding the pin against movement away from its seat in the wheel.

6. The combination with a wheel, of elongated journal pins in alinement and each having its inner end formed to engage the wheel axially thereof, a support for the journal pins in which they are movable longitudinally, and impellers for the journal pins each comprising a rock member engaging at one end a respective pin and at the other end engaging a fixed portion of the structure, each rock member being provided with a spring actuated device in coactive relation to a fixed portion of the structure to move the rock member in a direction to force its pin toward the wheel and also to prevent rocking movements of the impeller in the opposite direction while in operation.

7. The combination with a wheel, of a journal support therefor comprising a relatively fixed member, journal pins mounted therein for longitudinal sliding movement in alinement, each pin being shaped at one end to engage the wheel axially on the respective side thereof and at the other end extending outwardly beyond the support, and an impeller for each journal pin comprising an elongated rock member mounted between its ends in the supports with one end engaging the outer end of a respective pin, and a longitudinally movable member in the rock member provided with a spring constantly urging it in one direction and terminating in a head portion, said head portion and the supporting member being coactively shaped to permit expansion of the spring to move the rock member in a direction to impel the journal pin toward the wheel and effectively resistant to rocking movements of the rock member in the other direction during operation.

8. The combination with a wheel, of longitudinally movable alined journal pins therefor, a support for the journal pins in which they are slidably mounted, and an impeller for each journal pin comprising a rock member pivotally mounted at an intermediate point of its length in the support and at one end engaging the respective pin, and a spring impelled rod mounted in the impeller for movement longitudinally thereof and provided at the end remote from that engaging the respective journal pin with a beveled head or block, the support being provided with a coactive beveled portion arranged to be engaged by the beveled head.

9. The combination with a wheel, of longitudinally movable alined journal pins therefor, a support for the journal pins in which they are slidably mounted, and an impeller for each journal pin comprising a rock member pivotally mounted at an intermediate point of its length in the support and at one end engaging the respective pin, and a spring impelled rod mounted in the impeller for movement longitudinally thereof and provided at the end remote from that engaging the respective journal pin with a beveled head or block, the support being provided with a coactive beveled portion arranged to be engaged by the beveled head, the rod and rock member having passages therethrough adapted to be brought into alinement when the head is moved along the impeller for a predetermined distance in compressing relation to the spring.

10. The combination with a wheel, of journal pins therefor, a support for the pins in which they are movable in the direction of their length, and impellers for the pins each comprising a rock member mounted in the support with one end in engagement with a respective pin, a member in each impeller movable longitudinally thereof and provided with a spring related thereto to project said member, and said member having a bevel head in position to project beyond the end of the impeller remote from that engaging the journal pin, the support being provided with a bevel surface in coactive relation to the bevel head and the latter being provided with removable stop means in position to prevent movement of the head in the impeller toward the remote end thereof.

11. The combination with a wheel, of elongated journal pins therefor, a relatively fixed support for the journal pins in which they are mounted to slide one toward the other in alinement, and an impeller for each pin comprising an elongated channel member having a rockable mounting on the support and provided with a rod longitudinal of the impeller and mounted for sliding movement therein, said rod terminating at one end in a bevel head and provided with a spring tending to project the head from the corresponding end of the impeller with the other end of the impeller shaped to engage the outer end of the respective pin, and the support being provided with a bevel surface in coactive relation to the bevel head.

12. In a wheel carrier, a bifurcated head, journal pins movably mounted therein and provided with cone-shaped ends spaced from each other, a wheel provided with cone-shaped bearing members mounted on said cone-shaped ends, rock members at the sides of the carrier head, and bearing against the ends of the journal pins, and spring actuated members in coöperative relation to the rock members for movement lengthwise thereof.

13. In a wheel carrier, a pair of arms each formed with an interior space, a pair of journal pins each movably mounted at one end on each arm and provided with cone-shaped heads spaced from each other, a wheel provided with cone-shaped bearing members mounted on said cone-shaped heads, a pair of rock members mounted in the openings in the arms and each having one end thereof bearing against a respective one of the movable journal pins, and a spring actuated wedge-shaped member mounted in each rock member, the respective arm being provided with a wedge-shaped or bevel portion in coactive relation to the respective wedge-shaped member.

14. The combination with a wheel provided with oppositely disposed axial seats, of journal pins each having one end adapted to a respective seat and the other end provided with a transverse recess, a support for the pins in which they are movable in the direction of their length in alinement, said support being provided on opposite sides of the wheel with bevel or wedge-shaped surfaces in spaced relation to the journal pins, and an impeller for each journal pin comprising a rock member having at one end a tongue adapted to the transverse recess at the outer end of the respective pin and also provided with a rod mounted for longitudinal movement in the impeller and terminating at the end remote from the tongue in a wedge-shaped head in coactive relation to the respective wedge-shaped portion of the support, said arm being provided with a spring tending to move the wedge-shaped head into engagement with the wedge-shaped surface of the support, and said impeller and support having coactive means for rockably carrying the arm.

15. The combination with a wheel provided with oppositely disposed axial seats, of journal pins each having one end adapted to a respective seat and the other end provided with a transverse recess, a support for the pins in which they are movable in the direction of their length in alinement, said support being provided on opposite sides of the wheel with bevel or wedge-shaped surfaces in spaced relation to the journal pins, and an impeller for each journal pin comprising a rock member having at one end a tongue adapted to the transverse recess at the outer end of the respective pin and also provided with a rod mounted for longitudinal movement in the impeller and terminating at the end remote from the tongue in a wedge-shaped head in coactive relation to the respective wedge-shaped portion of the support, said arm being provided with a spring tending to move the wedge-shaped head into engagement with the wedge-shaped surface of the support, and said impeller and support having coactive means for rockably carrying the arm, the rod and the body of the impeller being provided with passages movable into alinement and the wedge-shaped head being provided with a passage for the introduction of a stop pin.

16. A bearing comprising bearing members movable oppositely one toward the other, and constantly active means urging said bearing members toward each other and substantially immovable to forces tending to separate the bearing members.

17. The combination with a wheel, of oppositely movable bearing members therefor and constantly active means tending to cause the bearing members to approach and provided with means holding the bearing members substantially immovable to forces tending to separate them.

18. The combination with a wheel, of an automatically adjustable bearing therefor comprising bearing members movable one toward the other in the direction of the axis of rotation of the wheel, and rockable members engaging the linearly movable bearing members and provided with means tending to move the rockable members in a direction to cause the bearing members to approach, and constructed to wholly resist forces exerted upon the bearing members to separate them.

19. The combination with a wheel, of bearing members therefor movable toward and from each other, rockable members engaging the bearing members, a spring actuated wedge carried by each rockable member, and a coacting means for each wedge causing the spring to impart to the rockable member a constant tendency in a direction to cause the bearing member to approach and wholly resistant to movement of the rockable member in the other direction.

20. The combination with a wheel, of bearing pins movable toward and from the wheel in the line of the axis of rotation thereof and each provided with a conical portion at the wheel engaging end, a lever for each pin having one end in engagement with the end of the pin remote from its conical end, a wedge mounted on the lever for movement lengthwise thereof, a spring carried by the lever and tending constantly to move the wedge in one direction, and a relatively fixed means in coactive relation to the wedge to cause a movement of the lever in a direction to in turn move the respective pin toward the wheel and wholly resistant to movements of the lever in the other direction.

21. The combination with a rotatable member, of a slidable journal member therefor, a relatively fixed support for the slidable journal member, an impeller having a constant tendency to move the journal member toward the rotatable member, and means for preventing retrograde movement of the journal member.

22. In a wheel carrier, a bifurcated head, journal pins mounted therein and provided with cone-shaped ends spaced one from the other, a wheel provided with cone-shaped bearing portions mounted on said cone-shaped ends, a rock member at one side of the carrier head and bearing against a respective journal pin, the latter being movable toward and from the wheel, and a spring actuated member in coöperative relation to the rock member for movement lengthwise thereof.

23. A bearing comprising oppositely disposed bearing members having relative axial adjustment, and constantly active means tending to cause the approach of the bearing members and substantially immovable to forces tending to separate the bearing members.

24. The combination with a wheel, of an automatically adjustable bearing therefor comprising bearing members relatively movable one toward the other in the direction of the axis of rotation of the wheel, and rockable means provided with means tending to move said rockable means in a direction to cause the approach of the bearing members and to wholly resist forces exerted upon the bearing members to separate them.

25. The combination with a wheel, of bearing members therefor relatively movable toward and from each other, a rockable member engaging a respective bearing member, a spring actuated wedge carried by the rockable member, and coacting means for the wedge causing the spring to impart to the rockable member a constant tendency in a direction to cause the bearing member engaged by the rockable member to approach the other bearing member and wholly resistant to movement of the rockable member in the other direction.

26. The combination with a wheel, of bearing pins relatively movable toward and from each other in the line of the axis of rotation of the wheel and each provided with a conical portion at the wheel engaging end, a lever having one end engaging a respective pin at the end remote from its conical end, a wedge mounted on the lever for movement lengthwise thereof, a spring carried by the lever and tending constantly to move the wedge in one direction, and a relatively fixed means in coactive relation to the wedge to cause movement of the lever in a direction to move the pin engaged thereby toward the wheel and wholly resistant to movements of the lever in the other direction.

In testimony that I claim the foregoing as my own, I have hereto affixed my signature in the presence of two witnesses.

GEORGE G. JONES.

Witnesses:
R. T. SAWYER,
C. F. MOORE.

Copies of this patent may be obtained for five cents each, by addressing the "Commissioner of Patents, Washington, D. C."